United States Patent
Nair et al.

(10) Patent No.: US 12,125,057 B2
(45) Date of Patent: Oct. 22, 2024

(54) SYSTEM, METHOD, AND COMPUTER PROGRAM PRODUCT FOR SEGMENTING ACCOUNTS

(71) Applicant: Visa International Service Association, San Francisco, CA (US)

(72) Inventors: Manoj Sreekumaran Nair, Dubai (AE); Sunali Sood, Dubai (AE); Avinash Gupta, Dubai (AE); Dmytro Dovgan, Dubai (AE); Ghanashyama Mahanty, Dubai (AE)

(73) Assignee: Visa International Service Association, San Francisco, CA (US)

( * ) Notice: Subject to any disclaimer, the term of this patent is extended or adjusted under 35 U.S.C. 154(b) by 199 days.

(21) Appl. No.: 17/398,178

(22) Filed: Aug. 10, 2021

(65) Prior Publication Data

US 2023/0051225 A1  Feb. 16, 2023

(51) Int. Cl.
| | |
|---|---|
| G06Q 30/02 | (2023.01) |
| G06F 18/20 | (2023.01) |
| G06F 18/232 | (2023.01) |
| G06Q 20/38 | (2012.01) |
| G06Q 20/40 | (2012.01) |
| G06Q 30/0207 | (2023.01) |

(52) U.S. Cl.
CPC ....... *G06Q 30/0224* (2013.01); *G06F 18/232* (2023.01); *G06F 18/285* (2023.01); *G06Q 20/3825* (2013.01); *G06Q 20/401* (2013.01)

(58) Field of Classification Search
CPC .......... G06Q 30/0224; G06Q 20/3825; G06Q 30/0207–0277; G06Q 20/401; G06F 18/232; G06F 18/285
See application file for complete search history.

(56) References Cited

U.S. PATENT DOCUMENTS

| | | | |
|---|---|---|---|
| 8,688,557 B2 * | 4/2014 | Rose | G06Q 40/06 705/36 R |
| 9,235,325 B2 | 1/2016 | Swerdlow et al. | |
| 9,342,835 B2 * | 5/2016 | Fordyce, III | G06Q 30/0267 |
| 9,836,758 B2 | 12/2017 | Bernard et al. | |
| 10,469,275 B1 * | 11/2019 | Broomall | H04L 51/52 |
| 11,062,401 B1 * | 7/2021 | Zhao | G06Q 50/01 |
| 11,062,404 B2 * | 7/2021 | Albee | G06Q 50/06 |
| 2011/0258039 A1 * | 10/2011 | Patwa | G06Q 30/00 705/14.45 |

(Continued)

*Primary Examiner* — Thuy N Nguyen
(74) *Attorney, Agent, or Firm* — The Webb Law Firm

(57) ABSTRACT

Described are a system, method, and computer program product for segmenting a plurality of accounts. The method includes processing transaction data for a plurality of transactions conducted by a plurality of accounts using a plurality of account identifiers, the transaction data for each transaction including data identifying the transaction as an electronic transaction or a physical transaction, segmenting the plurality of accounts into at least two groups including an active customer group and an inactive customer group based on the transaction data for each transaction conducted by each of the plurality of accounts, determining a third subset of customers from the second subset of customers based on at least one predictive model and a transaction profile of each customer of the second subset of customers, and automatically enrolling the third subset of customers into an automated campaign.

14 Claims, 9 Drawing Sheets

(56) References Cited

U.S. PATENT DOCUMENTS

| | | | | |
|---|---|---|---|---|
| 2011/0282728 A1* | 11/2011 | Bingham | G07F 17/3255 | 705/14.36 |
| 2012/0066065 A1* | 3/2012 | Switzer | G06Q 30/0255 | 705/1.1 |
| 2013/0124298 A1* | 5/2013 | Li | G06Q 30/0241 | 705/14.42 |
| 2013/0290513 A1* | 10/2013 | Shikari | H04L 67/1008 | 709/224 |
| 2015/0170175 A1* | 6/2015 | Zhang | H04M 15/851 | 705/7.33 |
| 2015/0220951 A1* | 8/2015 | Kurapati | H04M 15/851 | 705/7.33 |
| 2016/0086222 A1* | 3/2016 | Kurapati | G06Q 40/08 | 705/14.53 |
| 2016/0162917 A1* | 6/2016 | Singh | G06Q 30/0204 | 705/7.33 |
| 2016/0283973 A1* | 9/2016 | Corrie | G06Q 30/0273 | |
| 2016/0292722 A1* | 10/2016 | Myers | G06Q 30/0243 | |
| 2018/0218400 A1* | 8/2018 | Kerns | G06Q 30/0256 | |
| 2019/0057400 A1* | 2/2019 | Nair | G06Q 20/20 | |
| 2019/0114662 A1* | 4/2019 | Bennion | G06N 20/00 | |
| 2019/0180345 A1* | 6/2019 | Xie | G06Q 30/0202 | |
| 2019/0236652 A1* | 8/2019 | Kaul | G06Q 30/0255 | |
| 2019/0354858 A1* | 11/2019 | Chrzanowski | G06N 3/042 | |
| 2020/0126144 A1* | 4/2020 | Shao | G06Q 20/405 | |
| 2020/0184515 A1* | 6/2020 | deWet | G06Q 30/0251 | |
| 2020/0201907 A1 | 6/2020 | Wu et al. | | |
| 2021/0035159 A1* | 2/2021 | Zhou | G06Q 30/0269 | |
| 2021/0065053 A1* | 3/2021 | Higgins | G06F 9/542 | |
| 2021/0117952 A1* | 4/2021 | Jumper | G06Q 20/29 | |
| 2021/0133489 A1* | 5/2021 | Harris | G06F 18/23211 | |
| 2021/0192548 A1* | 6/2021 | Wang | G06F 18/23213 | |
| 2021/0208943 A1* | 7/2021 | Baughman | G06F 9/5055 | |
| 2021/0241314 A1* | 8/2021 | Yan | G06Q 30/0254 | |
| 2021/0342866 A1* | 11/2021 | Girabawe | G06Q 30/0205 | |
| 2022/0035668 A1* | 2/2022 | de Capoa | G06F 11/3433 | |
| 2022/0083456 A1* | 3/2022 | Le Fur | G06F 11/3664 | |
| 2022/0091657 A1* | 3/2022 | Tsien | G06F 1/3278 | |
| 2022/0207432 A1* | 6/2022 | Whelan | G06N 5/01 | |
| 2022/0405805 A1* | 12/2022 | Khoury | G06Q 30/0254 | |
| 2023/0004938 A1* | 1/2023 | Teng | G06Q 10/103 | |

* cited by examiner

| S.No. | Micro Persona | Category | Additional Details |
|---|---|---|---|
| 1 | Gourmet lover | Food | Spends in Fine Dining Categories |
| 2 | Fast Food Junkies | Food | Spends in Quick Service Restaurants like Mc Donalds, etc. |
| 3 | Coffee Addict | Food | Spends in Coffee stores like Starbucks, etc. |
| 4 | Stay-at-Home Foodie | Food | Food spends using Online Delivery Apps like Zomato, etc. |
| 5 | Outdoor Foodie | Food | Outdoor Face-to-Face Dining experience |
| 6 | Seasonal Shopper | Shopping | Spends on Apparel & Accessories during holiday seasons, festivals, discount season |
| 7 | Regular Shopper | Shopping | All year-round spends on Apparel & Accessories |
| 8 | Stay-at-Home Shopper | Shopping | Use of Online Shopping Apps like Amazon, etc. |
| 9 | Luxury Shopper | Shopping | Shopping of Premium brands like Cartier, Louis Vuitton, etc. |
| 10 | Home Aesthetics | Shopping | Shopping for home improvement and furnishing like IKEA, etc. |
| 11 | Tech Freak | Shopping | Spends in Electronics and Online Gaming |
| 12 | Self-Love/Pamper | L&E | Spends on self grooming like spa, salon, etc. |
| 13 | Movie goer | L&E | Spends on Movies |
| 14 | Kiddo | L&E | Spends on Kids related outdoor activities like play areas, etc. |
| 15 | Recreation Enthusiast | L&E | Spends on recreation outdoor activities like skating, skiing, etc. |
| 16 | Online Entertainment | L&E | Spends on Online entertainment like streaming videos, etc. |
| 17 | Bill Payer | Govt. & Utility | Bill paying spends of water, electricity, housing, maintenance, etc. |
| 18 | Govt. Services User | Govt. & Utility | Spends for Govt. services |
| 19 | Health spends | Health & Education | Spends at hospitals and other medical services |
| 20 | Educational expenses | Health & Education | Spends at Schools and Learning centres |
| 21 | Home-Bound Traveler | Travel | Frequent travel spends to a specific country |
| 22 | Leisure Traveler | Travel | Travel spends across multiple locations, mostly for leisure |
| 23 | Staycationer | Travel | In-country lodging spends |
| 24 | Luxury Holidayer | Travel | Travel spends at luxury locations |
| 25 | Fitness Freak | Fitness & Activities | Spends at fitness centres like Gym, etc. |
| 26 | Sports Lover | Fitness & Activities | Spends for sporting activities like Golf, etc. |
| 27 | Extra curricular activities | Fitness & Activities | Spends for extracurricular activities like Dance, etc. |
| 28 | Uberers | Transportation | Spends at cab services like Uber, etc. |
| 29 | Car Lovers | Transportation | Frequent car spends |
| 30 | Everyday spenders | Grocery | Food & Grocery spends at Supermarkets, Discount stores, etc. |

FIG. 3B

| Micro Persona (illustrative) | High | Medium | Low | Total |
|---|---|---|---|---|
| Stay-at-Home Foodie | 20,100 | 40,200 | 40,200 | 100,500 |
| Outdoor Foodie | 101,320 | 202,640 | 202,641 | 506,601 |
| Seasonal Shopper | 200,690 | 401,380 | 401,380 | 1,003,450 |
| Movie goer | 41,976 | 83,953 | 83,955 | 209,884 |
| Kiddo | 55,331 | 110,662 | 110,664 | 276,657 |
| Staycationer | 69,356 | 138,712 | 138,712 | 346,780 |
| Luxury Holidayer | 120,197 | 240,395 | 240,396 | 600,988 |
| Fitness Freak | 46,708 | 93,417 | 93,419 | 233,544 |

FIG. 5

SYSTEM, METHOD, AND COMPUTER PROGRAM PRODUCT FOR SEGMENTING ACCOUNTS

BACKGROUND

1. Technical Field

Disclosed embodiments or aspects relate generally to customer segmentation and, in particular embodiments or aspects, to a system, method, and computer program product for segmenting accounts based on electronic transaction activity.

2. Technical Considerations

It is increasingly difficult for issuers and other entities in a payment processing network to encourage activation of payment devices in electronic channels of commerce. Some customers with credit cards and/or debit cards, for example, may be less likely to use their accounts to purchase goods or services online, instead opting for in-person shopping for at least a portion of their needs. As every customer has different spending behaviors, marketing campaigns to encourage increased use of their payment device for electronic transactions are not effective for every customer.

SUMMARY

According to non-limiting embodiments or aspects, provided is a method for segmenting a plurality of accounts, comprising: processing transaction data for a plurality of transactions conducted by a plurality of accounts using a plurality of account identifiers, the transaction data for each transaction including data identifying the transaction as an electronic transaction or a physical transaction; segmenting the plurality of accounts into at least two groups comprising an active customer group and an inactive customer group based on the transaction data for each transaction conducted by each of the plurality of accounts, the active customer group comprising a first subset of customers that have conducted at least one electronic transaction and the inactive customer group comprising a second subset of customers that have not conducted at least one electronic transaction; determining a third subset of customers from the second subset of customers based on at least one predictive model and a transaction profile of each customer of the second subset of customers, the predictive model configured to determine a probability of a customer from the inactive customer group to conduct at least one electronic transaction, the predictive model based at least partially on transaction data associated with the first subset of customers; and automatically enrolling the third subset of customers into an automated campaign.

In non-limiting embodiments or aspects, the method further comprises automatically enrolling the first subset of customers into a second automated campaign different from the automated campaign. In non-limiting embodiments or aspects, the method further comprises determining the at least one predictive model from a plurality of models based on a job agent. In non-limiting embodiments or aspects, determining the third subset of customers from the second subset of customers comprises: segmenting the second subset of customers into a plurality of subgroups, each subgroup of the plurality of subgroups comprising a different subset of the second subset of customers based on the probability of each customer conducting at least one electronic transaction, the plurality of subgroups comprising a subgroup corresponding to the third subset of customers; and automatically enrolling the plurality of subgroups into the automated campaign or at least one different automated campaign based on a probability of customers in each subgroup conducting at least one electronic transaction.

In non-limiting embodiments or aspects, the automated campaign comprises automatically communicating at least one message including an offer to a customer. In non-limiting embodiments or aspects, the method further comprises: generating an electronic transaction engagement score for each customer of the first subset of customers based on transaction data for each customer; and segmenting the first subset of customers into a plurality of subgroups based on the electronic transaction engagement score for each customer. In non-limiting embodiments or aspects, the engagement score for each customer is based on at least one of the following: a transaction diversity, a spend amount, a transaction volume, a transaction frequency, an activation time, or any combination thereof.

According to non-limiting embodiments or aspects, provided is a system for segmenting a plurality of accounts, comprising: a transaction database comprising transaction data for a plurality of transactions conducted by a plurality of accounts using a plurality of account identifiers, the transaction data for each transaction including data identifying the transaction as an electronic transaction or a physical transaction; at least one processor programmed or configured to: segment the plurality of accounts into at least two groups comprising an active customer group and an inactive customer group based on the transaction data for each transaction conducted by each of the plurality of accounts, the active customer group comprising a first subset of customers that have conducted at least one electronic transaction and the inactive customer group comprising a second subset of customers that have not conducted at least one electronic transaction; determine a third subset of customers from the second subset of customers based on at least one predictive model and a transaction profile of each customer of the second subset of customers, the predictive model configured to determine a probability of a customer from the inactive customer group to conduct at least one electronic transaction, the predictive model based at least partially on transaction data associated with the first subset of customers; and automatically enroll the third subset of customers into an automated campaign.

In non-limiting embodiments or aspects, the at least one processor is further programmed or configured to automatically enroll the first subset of customers into a second automated campaign different from the automated campaign. In non-limiting embodiments or aspects, the at least one processor is further programmed or configured to determine the at least one predictive model from a plurality of models based on a job agent. In non-limiting embodiments or aspects, determining the third subset of customers from the second subset of customers comprises: segmenting the second subset of customers into a plurality of subgroups, each subgroup of the plurality of subgroups comprising a different subset of the second subset of customers based on the probability of each customer conducting at least one electronic transaction, the plurality of subgroups comprising a subgroup corresponding to the third subset of customers; and automatically enrolling the plurality of subgroups into the automated campaign or at least one different automated campaign based on a probability of customers in each subgroup conducting at least one electronic transaction.

In non-limiting embodiments or aspects, the automated campaign comprises automatically communicating at least one message including an offer to a customer. In non-limiting embodiments or aspects, the at least one processor is further programmed or configured to: generate an electronic transaction engagement score for each customer of the first subset of customers based on transaction data for each customer; and segment the first subset of customers into a plurality of subgroups based on the electronic transaction engagement score for each customer. In non-limiting embodiments or aspects, the engagement score for each customer is based on at least one of the following: a transaction diversity, a spend amount, a transaction volume, a transaction frequency, an activation time, or any combination thereof.

According to non-limiting embodiments or aspects, provided is a computer program product for segmenting a plurality of accounts, comprising at least one non-transitory computer-readable medium including program instructions that, when executed by at least one processor, cause the at least one processor to: store transaction data for a plurality of transactions conducted by a plurality of accounts using a plurality of account identifiers, the transaction data for each transaction including data identifying the transaction as an electronic transaction or a physical transaction; segment the plurality of accounts into at least two groups comprising an active customer group and an inactive customer group based on the transaction data for each transaction conducted by each of the plurality of accounts, the active customer group comprising a first subset of customers that have conducted at least one electronic transaction and the inactive customer group comprising a second subset of customers that have not conducted at least one electronic transaction; determine a third subset of customers from the second subset of customers based on at least one predictive model and a transaction profile of each customer of the second subset of customers, the predictive model configured to determine a probability of a customer from the inactive customer group to conduct at least one electronic transaction, the predictive model based at least partially on transaction data associated with the first subset of customers; and automatically enroll the third subset of customers into an automated campaign.

In non-limiting embodiments or aspects, the program instructions further cause the at least one processor to automatically enroll the first subset of customers into a second automated campaign different from the automated campaign. In non-limiting embodiments or aspects, the program instructions further cause the at least one processor to determine the at least one predictive model from a plurality of models based on a job agent. In non-limiting embodiments or aspects, wherein determining the third subset of customers from the second subset of customers comprises: segmenting the second subset of customers into a plurality of subgroups, each subgroup of the plurality of subgroups comprising a different subset of the second subset of customers based on the probability of each customer conducting at least one electronic transaction, the plurality of subgroups comprising a subgroup corresponding to the third subset of customers; and automatically enrolling the plurality of subgroups into the automated campaign or at least one different automated campaign based on a probability of customers in each subgroup conducting at least one electronic transaction. In non-limiting embodiments or aspects, the automated campaign comprises automatically communicating at least one message including an offer to a customer. In non-limiting embodiments or aspects, the program instructions further cause the at least one processor to: generate an electronic transaction engagement score for each customer of the first subset of customers based on transaction data for each customer; and segment the first subset of customers into a plurality of subgroups based on the electronic transaction engagement score for each customer.

Other non-limiting embodiments or aspects will be set forth in the following numbered clauses:

Clause 1: A method for segmenting a plurality of accounts, comprising: processing transaction data for a plurality of transactions conducted by a plurality of accounts using a plurality of account identifiers, the transaction data for each transaction including data identifying each transaction as an electronic transaction or a physical transaction; segmenting the plurality of accounts into at least two groups comprising an active customer group and an inactive customer group based on the transaction data for each transaction conducted by each of the plurality of accounts, the active customer group comprising a first subset of customers that have conducted at least one electronic transaction and the inactive customer group comprising a second subset of customers that have not conducted at least one electronic transaction; determining a third subset of customers from the second subset of customers based on at least one predictive model and a transaction profile of each customer of the second subset of customers, the at least one predictive model configured to determine a probability of a customer from the inactive customer group to conduct at least one electronic transaction, the at least one predictive model based at least partially on transaction data associated with the first subset of customers; and automatically enrolling the third subset of customers into an automated campaign.

Clause 2: The method of clause 1, further comprising: automatically enrolling the first subset of customers into a second automated campaign different from the automated campaign.

Clause 3: The method of clauses 1 or 2, further comprising: determining the at least one predictive model from a plurality of models based on a job agent.

Clause 4: The method of any of clauses 1-3, wherein determining the third subset of customers from the second subset of customers comprises: segmenting the second subset of customers into a plurality of subgroups, each subgroup of the plurality of subgroups comprising a different subset of the second subset of customers based on the probability of a customer conducting at least one electronic transaction, the plurality of subgroups comprising a subgroup corresponding to the third subset of customers; and automatically enrolling the plurality of subgroups into the automated campaign or at least one different automated campaign based on a probability of customers in each subgroup conducting at least one electronic transaction.

Clause 5: The method of any of clauses 1-4, wherein the automated campaign comprises automatically communicating at least one message including an offer to a customer.

Clause 6: The method of any of clauses 1-5, further comprising: generating an electronic transaction engagement score for each customer of the first subset of customers based on transaction data for each customer; and segmenting the first subset of customers into a plurality of subgroups based on the electronic transaction engagement score for each customer.

Clause 7: The method of any of clauses 1-6, wherein the electronic transaction engagement score for each customer is based on at least one of the following: a transaction diversity, a spend amount, a transaction volume, a transaction frequency, an activation time, or any combination thereof.

Clause 8: A system for segmenting a plurality of accounts, comprising: a transaction database comprising transaction data for a plurality of transactions conducted by a plurality of accounts using a plurality of account identifiers, the transaction data for each transaction including data identifying each transaction as an electronic transaction or a physical transaction; and at least one processor programmed or configured to: segment the plurality of accounts into at least two groups comprising an active customer group and an inactive customer group based on the transaction data for each transaction conducted by each of the plurality of accounts, the active customer group comprising a first subset of customers that have conducted at least one electronic transaction and the inactive customer group comprising a second subset of customers that have not conducted at least one electronic transaction; determine a third subset of customers from the second subset of customers based on at least one predictive model and a transaction profile of each customer of the second subset of customers, the at least one predictive model configured to determine a probability of a customer from the inactive customer group to conduct at least one electronic transaction, the at least one predictive model based at least partially on transaction data associated with the first subset of customers; and automatically enroll the third subset of customers into an automated campaign.

Clause 9: The system of clause 8, wherein the at least one processor is further programmed or configured to: automatically enroll the first subset of customers into a second automated campaign different from the automated campaign.

Clause 10: The system of clauses 8 or 9, wherein the at least one processor is further programmed or configured to: determine the at least one predictive model from a plurality of models based on a job agent.

Clause 11: The system of any of clauses 8-10, wherein determining the third subset of customers from the second subset of customers comprises: segmenting the second subset of customers into a plurality of subgroups, each subgroup of the plurality of subgroups comprising a different subset of the second subset of customers based on the probability of a customer conducting at least one electronic transaction, the plurality of subgroups comprising a subgroup corresponding to the third subset of customers; and automatically enrolling the plurality of subgroups into the automated campaign or at least one different automated campaign based on a probability of customers in each subgroup conducting at least one electronic transaction.

Clause 12: The system of any of clauses 8-11, wherein the automated campaign comprises automatically communicating at least one message including an offer to a customer.

Clause 13: The system of any of clauses 8-12, wherein the at least one processor is further programmed or configured to: generate an electronic transaction engagement score for each customer of the first subset of customers based on transaction data for each customer; and segment the first subset of customers into a plurality of subgroups based on the electronic transaction engagement score for each customer.

Clause 14: The system of any of clauses 1-13, wherein the electronic transaction engagement score for each customer is based on at least one of the following: a transaction diversity, a spend amount, a transaction volume, a transaction frequency, an activation time, or any combination thereof.

Clause 15: A computer program product for segmenting a plurality of accounts, comprising at least one non-transitory computer-readable medium including program instructions that, when executed by at least one processor, cause the at least one processor to: store transaction data for a plurality of transactions conducted by a plurality of accounts using a plurality of account identifiers, the transaction data for each transaction including data identifying the transaction as an electronic transaction or a physical transaction; segment the plurality of accounts into at least two groups comprising an active customer group and an inactive customer group based on the transaction data for each transaction conducted by each of the plurality of accounts, the active customer group comprising a first subset of customers that have conducted at least one electronic transaction and the inactive customer group comprising a second subset of customers that have not conducted at least one electronic transaction; determine a third subset of customers from the second subset of customers based on at least one predictive model and a transaction profile of each customer of the second subset of customers, the at least one predictive model configured to determine a probability of a customer from the inactive customer group to conduct at least one electronic transaction, the at least one predictive model based at least partially on transaction data associated with the first subset of customers; and automatically enroll the third subset of customers into an automated campaign.

Clause 16: The computer program product of clause 15, wherein the program instructions further cause the at least one processor to: automatically enroll the first subset of customers into a second automated campaign different from the automated campaign.

Clause 17: The computer program product of clauses 15 or 16, wherein the program instructions further cause the at least one processor to: determine the at least one predictive model from a plurality of models based on a job agent.

Clause 18: The computer program product of any of clauses 15-17, wherein determining the third subset of customers from the second subset of customers comprises: segmenting the second subset of customers into a plurality of subgroups, each subgroup of the plurality of subgroups comprising a different subset of the second subset of customers based on the probability of a customer conducting at least one electronic transaction, the plurality of subgroups comprising a subgroup corresponding to the third subset of customers; and automatically enrolling the plurality of subgroups into the automated campaign or at least one different automated campaign based on a probability of customers in each subgroup conducting at least one electronic transaction.

Clause 19: The computer program product of any of clauses 15-18, wherein the automated campaign comprises automatically communicating at least one message including an offer to a customer.

Clause 20: The computer program product of any of clauses 15-19, wherein the program instructions further cause the at least one processor to: generate an electronic transaction engagement score for each customer of the first subset of customers based on transaction data for each customer; and segment the first subset of customers into a plurality of subgroups based on the electronic transaction engagement score for each customer.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which:

FIG. 3B is a table of micropersonas according to non-limiting embodiments;

FIG. 5 is an output of an engagement scoring engine according to non-limiting embodiments;

DETAILED DESCRIPTION

Figure 1:
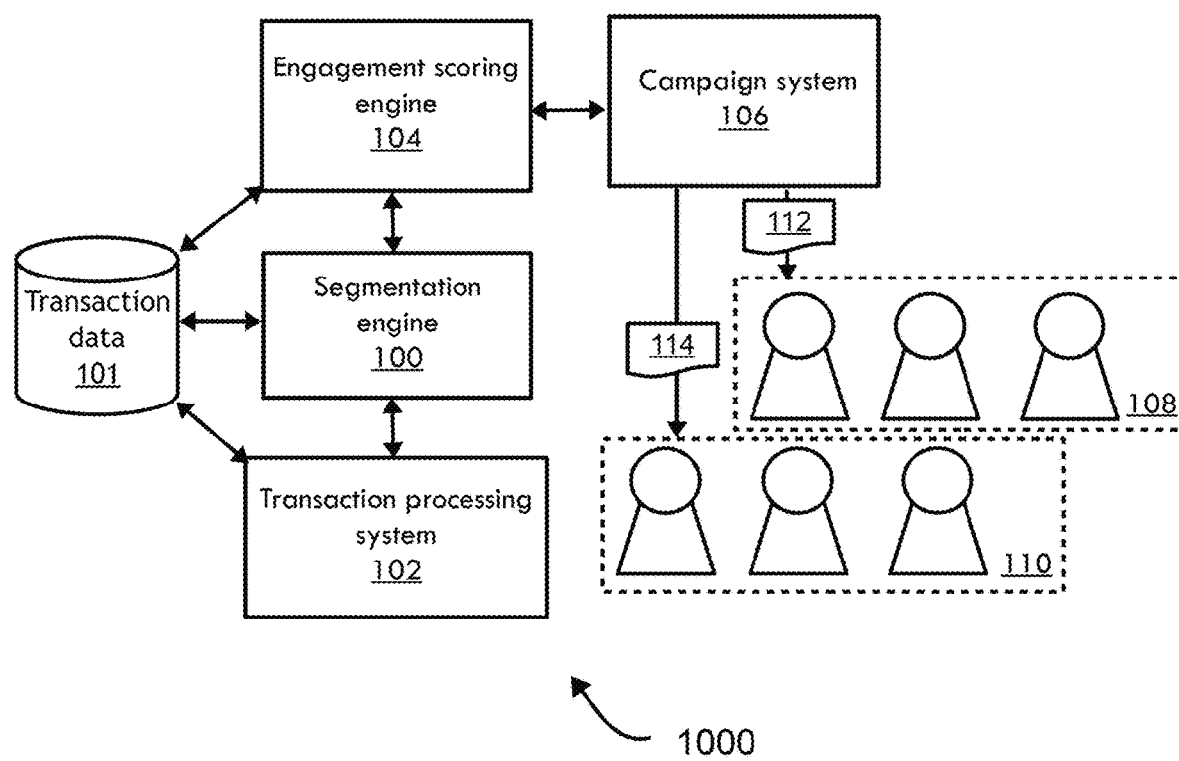
FIG. 1 is a schematic diagram of a system for segmenting accounts according to non-limiting embodiments.

For purposes of the description hereinafter, the terms "upper", "lower", "right", "left", "vertical", "horizontal", "top", "bottom", "lateral", "longitudinal," and derivatives thereof shall relate to non-limiting embodiments as they are oriented in the drawing figures. However, it is to be understood that non-limiting embodiments may assume various alternative variations and step sequences, except where expressly specified to the contrary. It is also to be understood that the specific devices and processes illustrated in the attached drawings, and described in the following specification, are simply exemplary embodiments. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet, and/or the like) that includes data. Any known electronic communication protocols and/or algorithms may be used such as, for example, TCP/IP (including HTTP and other protocols), WLAN (including 802.11 and other radio frequency-based protocols and methods), analog transmissions, cellular networks (e.g., Global System for Mobile Communications (GSM), Code Division Multiple Access (CDMA), Long-Term Evolution (LTE), Worldwide Interoperability for Microwave Access (WiMAX®), etc.), and/or the like. It will be appreciated that numerous other arrangements are possible.

As used herein, the term "mobile device" may refer to one or more portable electronic devices configured to communicate with one or more networks. As an example, a mobile device may include a cellular phone (e.g., a smartphone or standard cellular phone), a portable computer (e.g., a tablet computer, a laptop computer, etc.), a wearable device (e.g., a watch, pair of glasses, lens, clothing, and/or the like), a personal digital assistant (PDA), and/or other like devices. The term "client device," as used herein, refers to any electronic device that is configured to communicate with one or more servers or remote devices and/or systems. A client device may include a mobile device, a network-enabled appliance (e.g., a network-enabled television, refrigerator, thermostat, and/or the like), a computer, a point-of-sale (POS) system, and/or any other device or system capable of communicating with a network.

As used herein, the term "computing device" may refer to one or more electronic devices that are configured to process data. The computing device may be a mobile device. As an example, a mobile device may include a cellular phone (e.g., a smartphone or standard cellular phone), a portable computer, a wearable device (e.g., watches, glasses, lenses, clothing, and/or the like), a PDA, and/or other like devices. The computing device may not be a mobile device, such as a desktop computer. Furthermore, the term "computer" may refer to any computing device that includes the necessary components to receive, process, and output data, and normally includes a display, a processor, a memory, an input device, and a network interface. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUIs) with which a user may interact, either directly or indirectly (e.g., through a keyboard, mouse, etc.).

As used herein, the term "payment device" may refer to a portable financial device, an electronic payment device, a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a PDA, a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computing devices operated by or on behalf of an issuer institution, such as a server computer executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments, may be operated by or on behalf of a transaction service provider.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, near-field communication (NFC) receivers, RFID receivers, and/or other contactless transceivers or receivers, contact-based receivers, payment terminals, computers, servers, input devices, and/or other like devices that can be used to initiate a payment transaction.

As used herein, the term "server" or "server computer" may refer to or include one or more processors or computers, storage devices, or similar computer arrangements that are operated by or facilitate communication and processing for multiple parties in a network environment, such as the Internet, although it will be appreciated that communication may be facilitated over one or more public or private network environments and that various other arrangements are possible. Further, multiple computers, e.g., servers, or other computerized devices, e.g., POS devices, directly or indirectly communicating in the network environment may constitute a "system," such as a merchant's POS system. Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Referring now to FIG. 1, shown is a schematic diagram for a system 1000 for segmenting accounts according to non-limiting embodiments. As used herein, the phrases "segmenting accounts," "segmenting customers," "segmenting accounts and/or customers," and the like, may refer to segmenting a plurality of accounts and/or account holders (e.g., customers) into two or more groups. A transaction processing system 102 is in an electronic payment processing network and processes transactions conducted between merchants and customers. Transaction data associated with each of these purchases may be stored in a transaction database 101, including for each transaction a transaction value, a transaction type, a merchant identifier, a merchant category code (MCC), an account identifier, a time, a date, and/or the like. The transaction processing system 102 may be in communication with a segmentation engine 100 and/or the segmentation engine 100 may be in communication with the transaction database 101. The segmentation engine 100 may be in communication with an engagement scoring engine 104, which may be in communication with a campaign system 106.

With continued reference to FIG. 1, the segmentation engine 100, engagement scoring engine 104, and/or campaign system 106 may be one or more software and/or hardware components programmed or configured to perform one or more functions. For example, the segmentation engine 100, engagement scoring engine 104, and/or campaign system 106 may each be individual software applications or software functions/routines within a main software application. Moreover, the segmentation engine 100, engagement scoring engine 104, and/or campaign system 106 may be executed by the same or different computing systems, and such computing systems may be controlled by the same entity or different entities. Thus, the segmentation engine 100, engagement scoring engine 104, and/or campaign system 106 may communicate via one or more networks (e.g., through one or more Application Programming Interfaces (APIs), messaging protocols, and/or the like), through interconnected software functionality on a computing device, and/or in any other manner. In some non-limiting embodiments, the segmentation engine 100, and/or engagement scoring engine 104 may be part of the transaction processing system 102 and/or a service provided by the transaction processing system 102, although other arrangements are possible.

Still referring to FIG. 1, the segmentation engine 100 may, based on the transaction data, segment accounts (e.g., account identifiers, individual customers, households, and/or the like) based on transaction data in the transaction database 101. This segmentation may result in a first group 108 and a second group 110. In non-limiting embodiments, the first group 108 may be an active customer group including a first subset of customers that have conducted at least one electronic transaction (e.g., at all or within a predetermined time period), and the second group 110 may be an inactive customer group including a second subset of customers that have not conducted at least one electronic transaction (e.g., at all or within a predetermined time period). In non-limiting embodiments, two or more segments may be used. In non-limiting embodiments, the first group 108 and the second group 110 may not have overlapping accounts and/or customers.

The engagement scoring engine 104 in FIG. 1 may generate a score for an account (e.g., for an individual account identifier, for a customer, and/or the like) that represents a probability of the account being used for an electronic transaction (e.g., in a period of time or at all). An engagement score for a customer in the first group 108 of customers may represent a probability that a particular account or customer will engage again in an electronic transaction within a predetermined time period (e.g., the next week, month, and/or the like). An engagement score for the second group 110 of customers may represent a probability that a particular account or customer will engage in an electronic transaction for the first time (e.g., ever or within a predetermined time period). The engagement scores generated by the engagement scoring engine 104 may be communicated to and/or used by the campaign system 106 to automatically initiate one or more marketing campaigns to encourage customers in the first group 108 to engage in additional electronic transactions and/or electronic transactions in specific categories, and to encourage customers in the second group 110 to begin using their accounts to engage in electronic transactions. In some non-limiting embodiments, the campaign system 106 may be operated by and/or part of an issuer system associated with payment devices issued to customers.

Figure 3A:
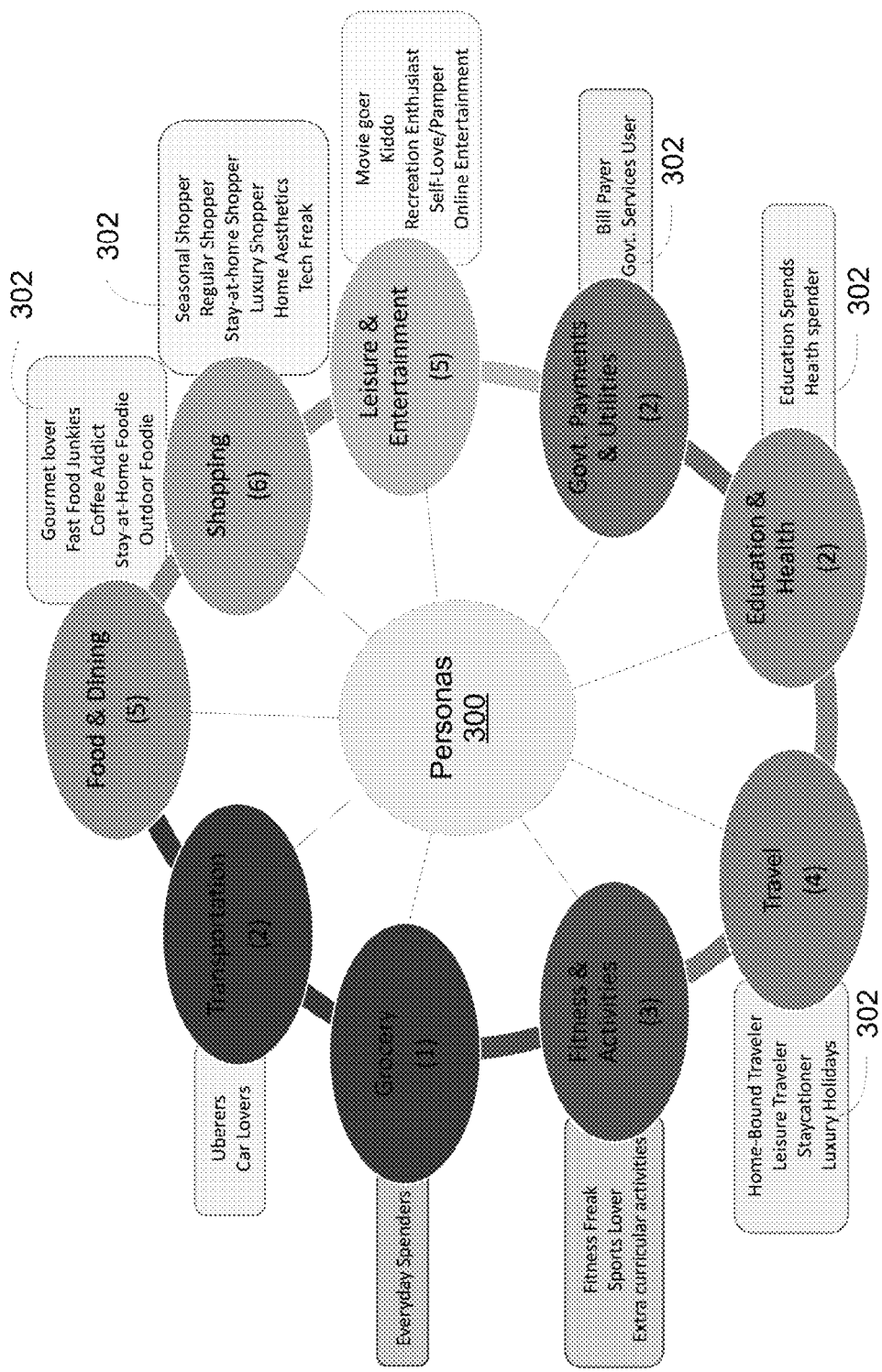
FIG. 3A is a diagram of personas and micropersonas according to non-limiting embodiments.

In non-limiting embodiments, the first group 108 and/or the second group 110 may be further segmented into micropersonas. This further segmentation may be performed by the segmentation engine 100 or another system, and may be performed before or after engagement scores are generated. A "micropersona," as used herein, refers to a categorization of customers based on the customers' transaction histories such that each customer is associated with one or more micropersonas that represent the customer's spending behavior. A micropersona may be generated by associating a plurality of spending categories (e.g., by MCC or the like) and/or amounts. For example, referring to FIG. 3A, shown is a plurality of personas 300, each persona associated with one or more micropersonas 302. The personas 300 may include one or more grouped MCCs or, in other examples, be grouped independently of MCC. The micropersonas 302 are subsets of the personas 300 and may be based on spending categories (e.g., by MCC or the like) and/or transaction data other than MCC. A further illustration of micropersonas is shown in FIG. 3B. It will be appreciated that micropersonas may be defined in various ways. As an example, a micropersona called "gourmet lover" may be defined by accounts and/or customers that engage in spending categories that include both restaurants and grocery stores at least once a week and for at least a predetermined transaction amount (e.g., $50) for each transaction. Thus, a micropersona, in some non-limiting examples, may be defined by one or more spending categories, one or more spending frequencies, and/or one or more spending amounts.

In non-limiting embodiments, the segmentation engine 100 shown in FIG. 1 may associate different accounts and/or customers with different micropersonas. A customer may be associated with one or more personas and, for each persona, one or more micropersonas. The account and/or customer may be associated with a micropersona in a database with account identifiers and/or customer identifiers being linked to identifiers of each micropersona.

Figure 2:
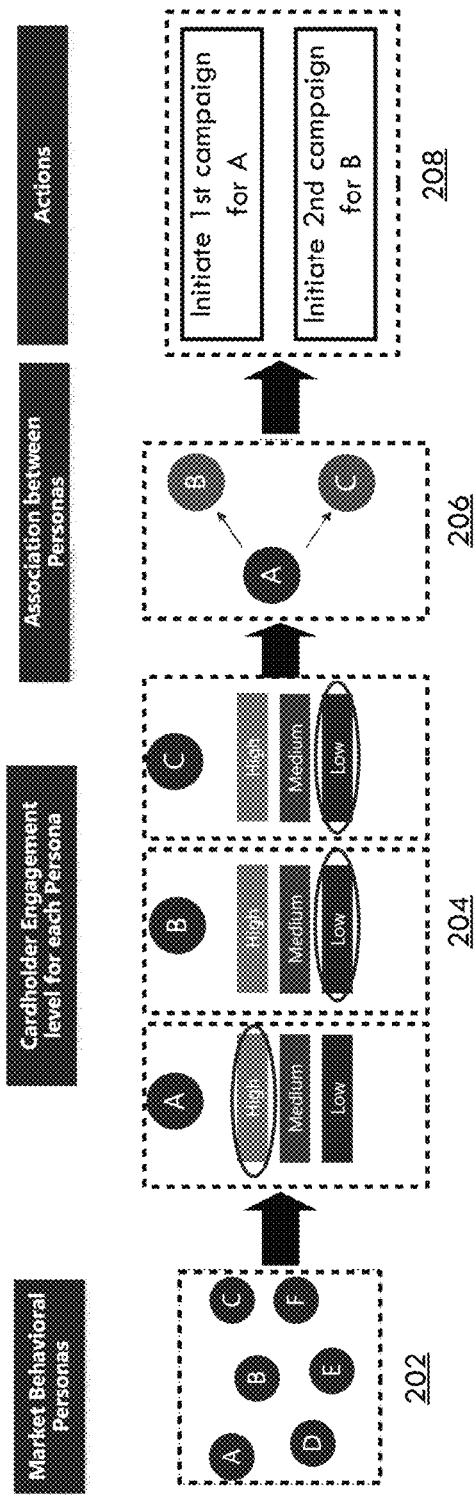
FIG. 2 is a schematic diagram of a process for segmenting accounts according to non-limiting embodiments.

Referring to FIG. 2, a schematic diagram of a process for segmenting accounts is shown according to a non-limiting embodiment. The process shown in FIG. 2 may, in some examples, be performed by the segmentation engine 100 in FIG. 1. A plurality of segments A-F 202 are shown, where each segment A-F corresponds to a micropersona and a plurality of customers associated with that micropersona. The plurality of segments 202 are passed to an engagement scoring engine 204 (e.g., such as the engagement scoring engine 104 shown in FIG. 1) to generate an engagement score for each micropersona and/or each account/customer. The score may be numerical or, as shown in FIG. 2, may be outputted as a category such as low, medium, or high, based on one or more predetermined thresholds. The scored micropersonas may then be processed by one or more algorithms 206 to identify associations between micropersonas based on, for example, a distance and/or clustering algorithm. This may be used to determine which micropersonas potentially behave like other micropersonas. In the example shown in FIG. 2, a micropersona associated with segment B is determined to be more similar to segment A than segment C is (e.g., closer according to distance metric and/or similarly clustered). The micropersonas are then communicated to a campaign system 208 (e.g., such as the campaign system 106 shown in FIG. 1) to automatically take one or more actions, such as initiating a first campaign for segment A and a second campaign for segment B that is different (e.g., different timing of offers, different offers, different forms of communication, and/or the like) than the first campaign. The automated campaigns may include automated emails, text messages, offers communicated through various channels, and/or the like.

Figure 4:
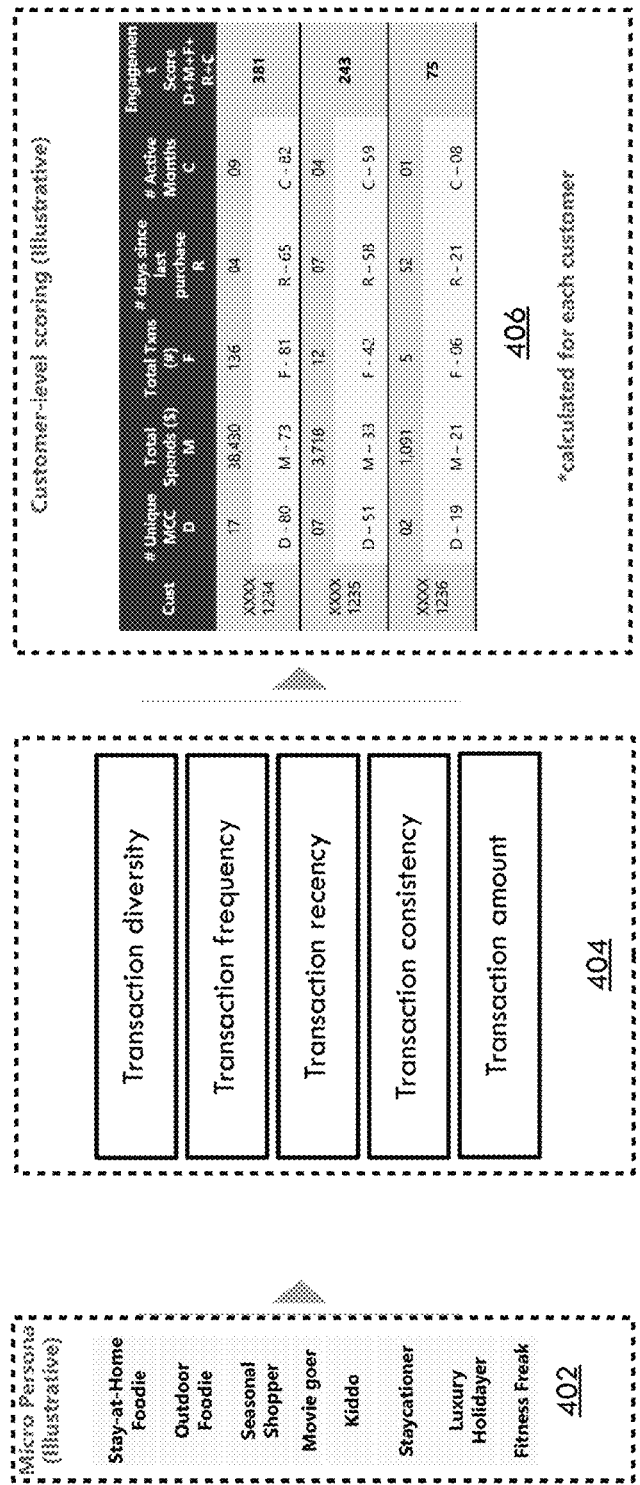
FIG. 4 is a schematic diagram of a process for generating an engagement score according to non-limiting embodiments.

Referring to FIG. 4, a schematic diagram of a process for generating an engagement score is shown according to a non-limiting embodiment. The process shown in FIG. 4 may, in some examples, be performed by the engagement scoring engine 104 in FIG. 1. Micropersonas 402 are input into a scoring algorithm 404 that generates scores for each micropersona based on several different transaction data parameters. Such parameters may include transaction diversity (e.g., a number of unique transaction categories (e.g., MCCs or the like) associated with customers of that micrpersona), transaction frequency, transaction recency (e.g., a time since the last transaction), transaction consistency (e.g., amount of time the accounts are active, such as an activation time), transaction amount, and/or the like. The scores generated by the algorithm 404 may represent each micropersona. In some non-limiting embodiments, a customer scoring algorithm 406 may be applied to generate an engagement score for each customer associated with the micropersona (e.g., a customer-level engagement score). In some examples, the customer-level engagement score is based on the engagement score for the associated micropersona. It will be appreciated that engagement scores may be generated for each account/customer and/or each micropersona (e.g., a group of accounts/customers).

Referring now to FIG. 5, an output of an engagement scoring engine, such as the engagement scoring engine 104 in FIG. 1, is shown according to non-limiting embodiments. The numerical values are segmented into "high," "medium," and "low" segments based on deciles, although it will be appreciated that any other threshold or segmentation may be used to segment the scores into any number of different categories.

Figure 6:
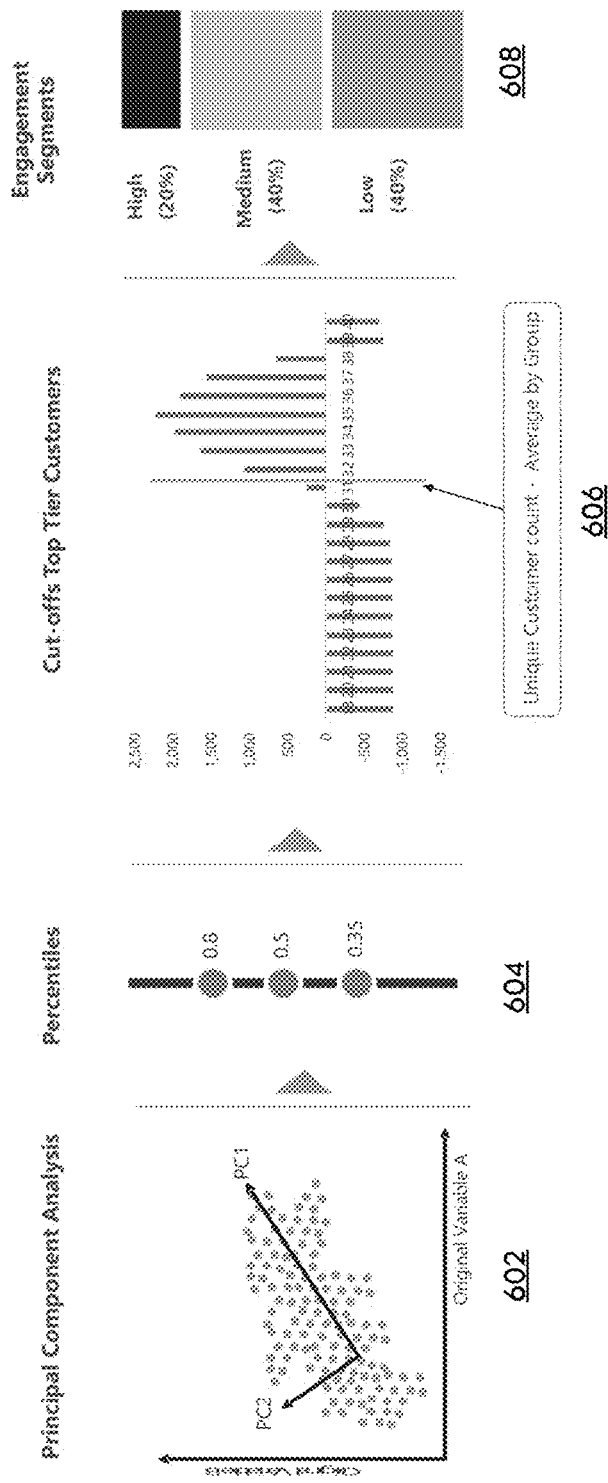
FIG. 6 is a schematic diagram of a process for generating an engagement score according to non-limiting embodiments.

Referring now to FIG. 6, a schematic diagram of a process for generating an engagement score is shown according to a non-limiting embodiment. The process shown in FIG. 6 may, in some examples, be performed by the engagement scoring engine 104 in FIG. 1. A principal component analysis (PCA) is performed on the input data for the engagement score (such as, but not limited to, transaction diversity (e.g., a number of unique transaction categories (e.g., MCCs or the like) associated with customers of that micrpersona), transaction frequency, transaction recency (e.g., a time since the last transaction), transaction consistency (e.g., amount of time the accounts are active), transaction amount, and/or the like). This reduces a multidimensional representation of the engagement score (e.g., the above-mentioned parameters are associated with five (5) dimensions) to a 1-dimensional space. The accounts and/or customers in the micropersona may then be further segmented based on score thresholds 604, 606 (e.g., such as percentiles of engagement probability) into, for example, three groups 608 (low, medium, and high engagement). Each of these groups may be treated differently for configuring a marketing campaign and may be differently routed to different automated campaign processes. It will be appreciated that, in non-limiting embodiments, the accounts and/or customers in each micropersona may be segmented in various ways and in any number of segments (e.g., two or more).

In non-limiting embodiments, the marketing campaign initiated for an account and/or customer may be configured to move the categorization of the account and/or customer from a first group (e.g., a low engagement) to a next group (e.g., a medium engagement) by performing actions that, based on one or more predictive algorithms, are likely to increase the engagement of that account and/or customer. In this manner, multiple levels (e.g., tiers) of engagement can be arranged with a model-driven goal of optimizing all accounts and/or users to a higher level of engagement.

Figure 7:
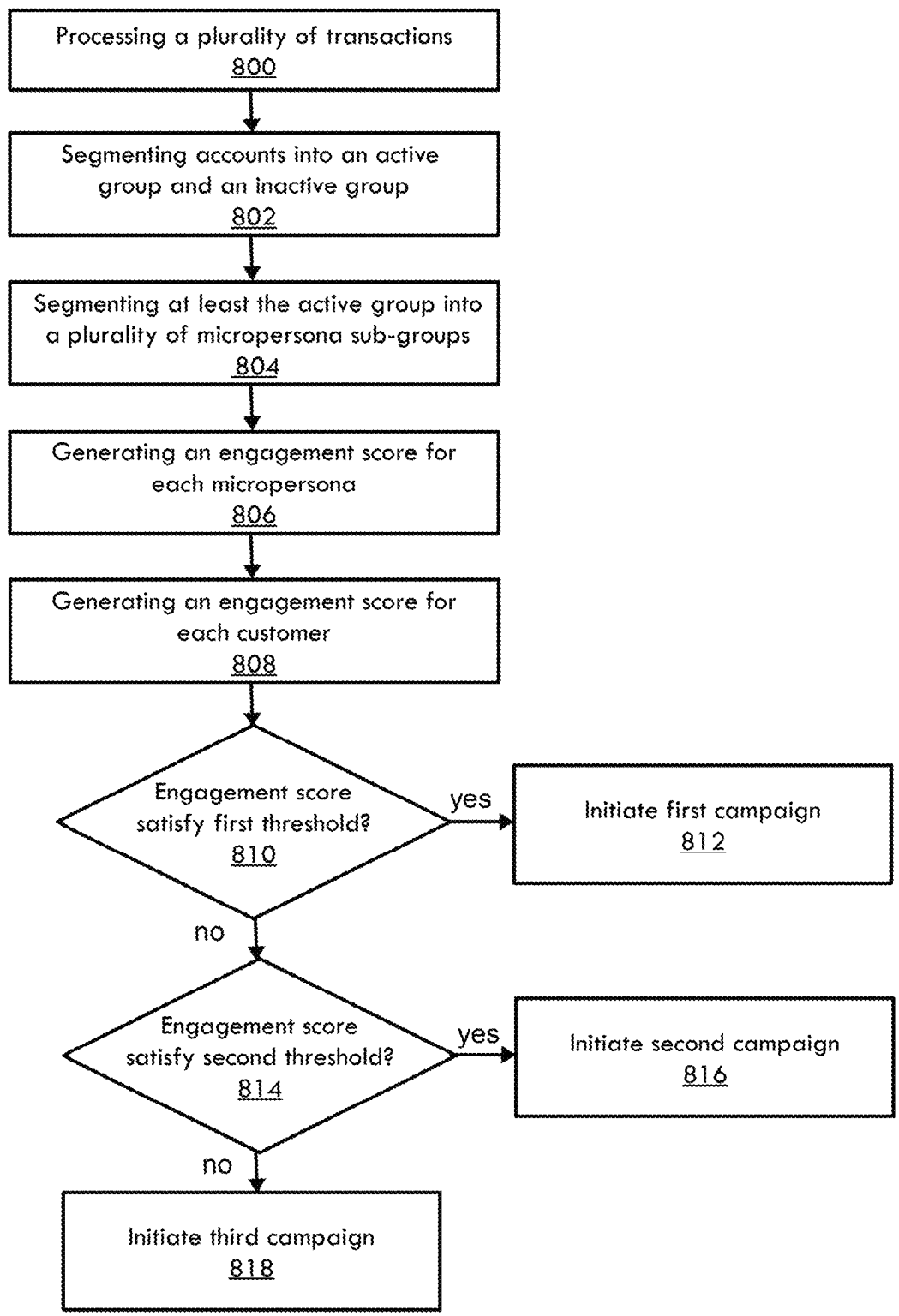
FIG. 7 is a flow diagram of a process of segmenting accounts according to non-limiting embodiments.

Referring now to FIG. 7, a process for segmenting accounts is shown according to a non-limiting embodiment. The steps shown in FIG. 7 are for example purposes only. Additional, fewer, different, and/or a varied order of steps may be implemented in non-limiting embodiments. The steps shown in FIG. 7 may be performed by a transaction processing system, payment gateway, issuer system, and/or one or more separate computing systems. At step 800, a plurality of transactions is processed. Processing the transactions may include, for example, processing a plurality of transactions between a plurality of account holders and a plurality of merchants with a transaction processing system, payment gateway, issuer system, and/or the like, and receiving (e.g., identifying, obtaining, extracting, and/or the like) the related transaction data. Transaction data concerning each of these transactions may be stored in a transaction database, including a transaction value, a transaction type, a merchant identifier, an MCC, an account identifier, a time, a date, and/or the like.

With continued reference to FIG. 7, at step 802 accounts and/or customers may be segmented into at least two groups including an active group and an inactive group based on the transaction data. The active group may include a first subset of accounts and/or customers that have conducted at least one electronic transaction. The inactive group may include a second subset of accounts and/or customers that have not conducted at least one electronic transaction (e.g., ever or within a predetermined time period). In some non-limiting embodiments, all accounts and/or customers may be segmented into one of these two groups. At step 804 the active group segmented from the accounts and/or customers at step 802 is further segmented. For example, a plurality of subsets of accounts and/or customers may be further segmented into one or more micropersonas based the transaction data for each account and/or customer.

Still referring to FIG. 7, at step 806 an engagement score may be generated for each micropersona. This may include, for example, determining for each micropersona whether the customers associated with that micropersona are likely to increase their engagement (e.g., the frequency of conducting electronic transactions) with electronic transactions or a specific type of transaction, decrease their engagement with such transactions, maintain the same amount of engagement, initiate a first engagement with an electronic transaction, and/or the like. A score may be numerical (e.g., between 0 and 1, between 1 and 10, and/or the like). At step 808, a customer-level engagement score may be generated based on transaction data for each individual customer and, in some examples, the micropersona engagement score for the micropersona of the customer. However, it will be appreciated that, in some non-limiting embodiments, step 806 may not be performed and only customer-level engagement scores may be generated. Moreover, step 808 may be performed for the accounts and/or customers in the first group (e.g., active group) and/or in the second group (e.g., inactive group).

In non-limiting embodiments, the engagement scores for the customers may be generated based on a predictive model and a transaction profile of each customer. For example in some non-limiting embodiments, the predictive model is configured to determine the probability that a customer from the inactive group conducts at least one electronic transaction. Additionally or alternatively, in some non-limiting embodiments the predictive model is configured to determine the probability that a customer from the active group increases, decreases, or maintains a current engagement with electronic transactions. In some examples, a job agent may be used to determine a predictive model from a plurality of possible predictive models. A job agent may include, for example, a software process configured to distribute processing tasks to specific applications, functions, and/or computing devices based on various parameters.

With continued reference to FIG. 7, at step 810 it is determined whether an account and/or customer (or a plurality of customers associated with a micropersona) have an engagement score (e.g., a customer-level engagement score) that satisfies a first threshold (e.g., meets and/or exceeds a predetermined threshold). If the engagement score satisfies the first threshold, the account and/or customer may be categorized as having a high probability of increasing engagement with electronic transactions. A first campaign may be initiated at step 812 for each account and/or customer that satisfies the first threshold. The first campaign may include an automated campaign including automated emails, text messages, offers communicated through various channels, and/or the like. The offers provided in the first campaign may be different from offers provided in other campaigns.

At step 814 of FIG. 7, it is determined whether an account and/or customer (or a plurality of customers associated with a micropersona) that did not satisfy the first threshold have an engagement score that satisfies a second threshold (e.g., meets and/or exceeds a predetermined threshold). If the engagement score satisfies the second threshold, the customer may be categorized as having a medium probability of increasing engagement with electronic transactions. A second campaign may be initiated at step 816 for each customer that satisfies the second threshold. The second campaign may include an automated campaign including automated emails, text messages, offers communicated through various channels, and/or the like. The offers provided in the second campaign may be different from offers provided in the first campaign. Moreover, the communications of the second campaign may be timed differently than communications in the first campaign. It will be appreciated that the first and second automated campaigns may differ in other ways and may also have one or more features in common. The second campaign may be automatically orchestrated based on one or more predictive models to maximize the likelihood that the account and/or customer will satisfy the first threshold in the future. For example, a predictive model may be used to determine one or more offers to provide to encourage expanded spending in a similar, but different, micropersona. This may be a micropersona within the same category of spend (e.g., food), such as a "gourmet lover" micropersona that is provided with an offer for a "coffee drinker" micropersona to encourage varied spending within a "food" category. Additionally or alternatively, a predictive model may be used to determine one or more offers to provide to encourage expanded spending or initiation of spending in a micropersona within a different category. For example, it may be determined that customers assigned to a "gourmet lover" micropersona may be likely to start spending or increase spending on vacations because of the overlapping micropersonas of other customers.

Still referring to FIG. 7, if an account and/or customer (or a plurality of customers associated with a micropersona) did not satisfy the second threshold, the customer may be categorized as having a low probability of increasing engagement with electronic transactions. That customer may not be targeted with a campaign in some examples. Alternatively, a third campaign may be initiated at step 818 for each customer that fails to satisfy the first and second thresholds and/or satisfies a third threshold. The third campaign may include an automated campaign including automated emails, text messages, offers communicated through various channels, and/or the like. The offers provided in the third campaign may be different from offers provided in the first and/or second campaign. Moreover, the communications of the third campaign may be timed differently than communications in the first and/or second campaign. It will be appreciated that the third automated campaign may differ in other ways and may also have one or more features in common with the first and/or second automated campaign. The third campaign may be automatically orchestrated based on one or more predictive models to maximize the likelihood that the account and/or customer will satisfy the second threshold in the future. Further, although three campaigns are shown in FIG. 7, it will be appreciated that any number of additional campaigns are possible based on further engagement score thresholds and/or other parameters.

Figure 8:
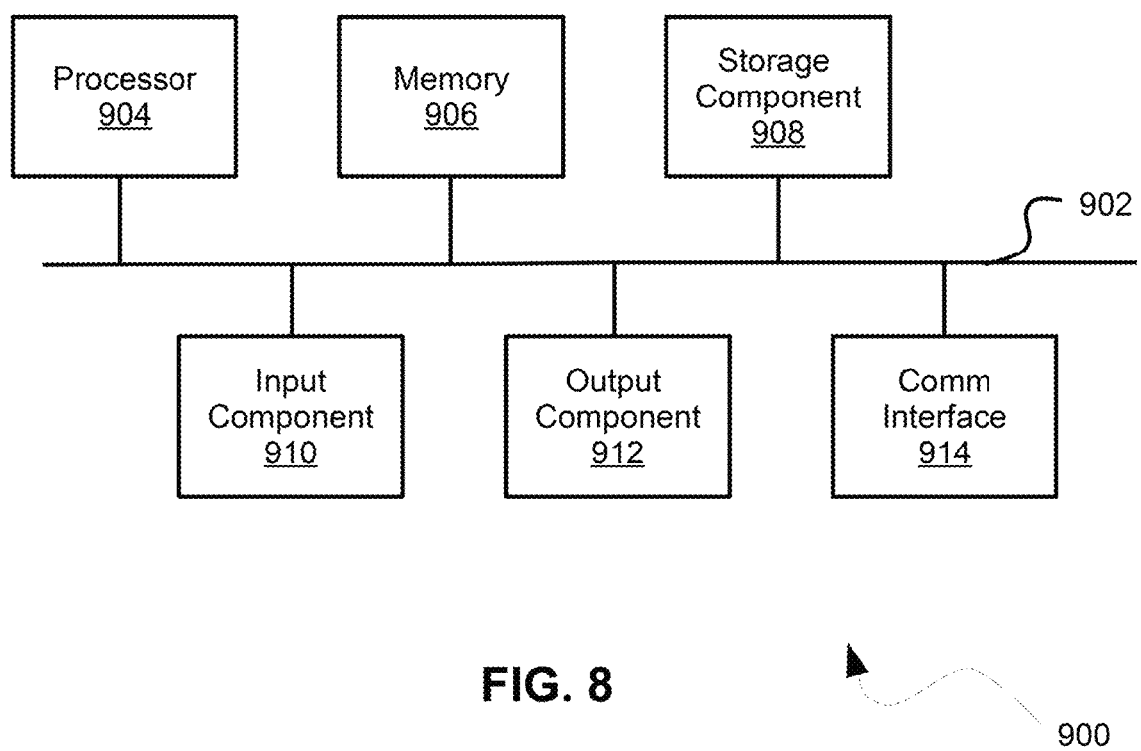
FIG. 8 shows example components of a computing device for implementing and performing the systems and methods described herein according to non-limiting embodiments.

Referring now to FIG. 8, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 1. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), virtual or augmented reality depicting systems and devices, etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 8, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A method for segmenting a plurality of accounts, comprising:
    processing, by a transaction processing system, transaction data for a plurality of transactions conducted by a plurality of accounts using a plurality of account identifiers, the transaction data for each transaction including data identifying each transaction as an electronic transaction or a physical transaction, the transaction data comprising a plurality of transaction data parameters;
    segmenting, by a segmentation engine, the plurality of accounts into at least two groups comprising an active customer group and an inactive customer group based on the transaction data for each transaction conducted by each of the plurality of accounts, the active customer group comprising a first subset of the plurality of accounts associated with a first subset of customers that have conducted at least one electronic transaction within a predetermined time period and the inactive customer group comprising a second subset of the plurality of accounts associated with a second subset of customers that have not conducted at least one electronic transaction within the predetermined time period;
    segmenting, by the segmentation engine, the second subset of the plurality of accounts associated with the second subset of customers into at least two micropersona subgroups based on the transaction data for each transaction conducted by each of the second subset of the plurality of accounts;
    generating, by an engagement scoring engine, an electronic transaction engagement score for each of the at least two micropersona subgroups based on the transaction data for each transaction conducted by each of the second subset of the plurality of accounts, the transaction data for each transaction conducted by each of the second subset of the plurality of accounts comprising a plurality of transaction parameters comprising an activation time for each account of the second subset of the plurality of accounts;
    determining, by the engagement scoring engine, at least one predictive model from a plurality of models based on a job agent, the job agent configured to distribute tasks to one or more processors;
    generating, by the engagement scoring engine, a customer-level engagement score for the second subset of customers based on the transaction data for each transaction conducted by each of the second subset of the plurality of accounts comprising the activation time for each account of the second subset of the plurality of accounts, the electronic transaction engagement score for each of the at least two micropersona subgroups, and the at least one predictive model;
    determining, by the engagement scoring engine, whether the customer-level engagement score for the second subset of customers satisfies a threshold value;
    determining, by a campaign system, a third subset of customers comprising a portion of the second subset of customers based on determining that the customer-level engagement score for each customer of the portion of the second subset of customers satisfies the threshold value;
    automatically enrolling, by the campaign system, the third subset of customers into a first automated campaign; and
    automatically enrolling, by the campaign system, the first subset of customers into a second automated campaign different from the first automated campaign.

2. The method of claim 1, further comprising:
    determining, by the segmentation engine, a fourth subset of customers from the second subset of customers, wherein determining the fourth subset of customers from the second subset of customers comprises:
        segmenting the second subset of customers into a plurality of subgroups, each subgroup of the plurality of subgroups comprising a different subset of the second subset of customers based on a probability of a customer conducting at least one electronic transaction, the plurality of subgroups comprising a subgroup corresponding to the third subset of customers; and
    automatically enrolling, by the campaign system, the plurality of subgroups into the first automated campaign, the second automated campaign, or at least one different automated campaign based on a probability of customers in each subgroup conducting at least one electronic transaction.

3. The method of claim 1, wherein the first automated campaign comprises automatically communicating at least one message including an offer to a customer.

4. The method of claim 1, wherein the electronic transaction engagement score for each customer is based on at least one of the following: a transaction diversity, a spend amount, a transaction volume, a transaction frequency, or any combination thereof.

5. The method of claim 1, wherein determining the third subset of customers comprising a portion of the second subset of customers comprises:
    determining the third subset of customers based on a clustering algorithm.

6. A system for segmenting a plurality of accounts, comprising:
    a transaction database comprising transaction data for a plurality of transactions conducted by a plurality of accounts using a plurality of account identifiers, the transaction data for each transaction including data identifying each transaction as an electronic transaction or a physical transaction, the transaction data comprising a plurality of transaction data parameters; and a segmentation engine configured to:
   segment the plurality of accounts into at least two groups comprising an active customer group and an inactive customer group based on the transaction data for each transaction conducted by each of the plurality of accounts, the active customer group comprising a first subset of the plurality of accounts associated with a first subset of customers that have conducted at least one electronic transaction within a predetermined time period and the inactive customer group comprising a second subset of the plurality of accounts associated with a second subset of customers that have not conducted at least one electronic transaction within the predetermined time period; and
   segment the second subset of the plurality of accounts associated with the first subset of customers into at least two micropersona subgroups based on the transaction data for each transaction conducted by each of the second subset of the plurality of accounts;
an engagement scoring engine configured to:
   generate an electronic transaction engagement score for each of the at least two micropersona subgroups based on the transaction data for each transaction conducted by each of the second subset of the plurality of accounts, the transaction data for each transaction conducted by each of the second subset of the plurality of accounts comprising a plurality of transaction parameters comprising an activation time for each account of the second subset of the plurality of accounts;
   determine at least one predictive model from a plurality of predictive models based on a job agent, the job agent configured to distribute tasks to one or more processors;
   generate a customer-level engagement score for the second subset of customers based on the transaction data for each transaction conducted by each of the second subset of the plurality of accounts comprising the activation time for each account of the second subset of the plurality of accounts, the electronic transaction engagement score for each of the at least two micropersona subgroups, and the at least one predictive model;
   determine whether the customer-level engagement score for the second subset of customers satisfies a threshold value; and
   determine a third subset of customers comprising a portion of the second subset of customers based on determining that the customer-level engagement score for each customer of the portion of the second subset of customers satisfies the threshold value; and
a campaign system configured to:
   automatically enroll the third subset of customers into a first automated campaign; and
   automatically enroll the first subset of customers into a second automated campaign different from the first automated campaign.

7. The system of claim 6, wherein the segmentation engine is further configured to:
   determine a fourth subset of customers from the second subset of customers, wherein, when determining the fourth subset of customers from the second subset of customers, the segmentation engine is programmed or configured to:
      segment the second subset of customers into a plurality of subgroups, each subgroup of the plurality of subgroups comprising a different subset of the second subset of customers based on a probability of a customer conducting at least one electronic transaction, the plurality of subgroups comprising a subgroup corresponding to the third subset of customers; and
   wherein the campaign system is further configured to:
      automatically enroll the plurality of subgroups into the first automated campaign, the second automated campaign, or at least one different automated campaign based on a probability of customers in each subgroup conducting at least one electronic transaction.

8. The system of claim 6, wherein the first automated campaign comprises automatically communicating at least one message including an offer to a customer.

9. The system of claim 6, wherein the electronic transaction engagement score for each customer is based on at least one of the following: a transaction diversity, a spend amount, a transaction volume, a transaction frequency, or any combination thereof.

10. The system of claim 6, wherein when determining the third subset of customers comprising a portion of the second subset of customers, the campaign system is configured to:
   determine the third subset of customers based on a clustering algorithm.

11. A computer program product for segmenting a plurality of accounts, comprising: at least one non-transitory computer-readable medium including program instructions that, when executed by at least one processor, cause the at least one processor to:
   store, by a transaction processing system, transaction data for a plurality of transactions conducted by a plurality of accounts using a plurality of account identifiers, the transaction data for each transaction including data identifying the transaction as an electronic transaction or a physical transaction, the transactions data comprising a plurality of transaction data parameters;
   segment, by a segmentation engine, the plurality of accounts into at least two groups comprising an active customer group and an inactive customer group based on the transaction data for each transaction conducted by each of the plurality of accounts, the active customer group comprising a first subset of the plurality of accounts associated with a first subset of customers that have conducted at least one electronic transaction within a predetermined time period and the inactive customer group comprising a second subset of the plurality of accounts associated with a second subset of customers that have not conducted at least one electronic transaction within the predetermined time period;
   segment, by the segmentation engine, the second subset of the plurality of accounts associated with the second subset of customers into at least two micropersona subgroups based on the transaction data for each transaction conducted by each of the second subset of the plurality of accounts;
   generate, by an engagement scoring engine, an electronic transaction engagement score for each of the at least two micropersona subgroups based on the transaction data for each transaction conducted by each of the second subset of the plurality of accounts, the transaction data for each transaction conducted by each of the second subset of the plurality of accounts comprising a plurality of transaction parameters comprising an activation time for each account of the second subset of the plurality of accounts;

determine, by the engagement scoring engine, at least one predictive model from a plurality of predictive models based on a job agent, the job agent configured to distribute tasks to one or more processors;

generate, by the engagement scoring engine, a customer-level engagement score for the second subset of customers based on the transaction data for each transaction conducted by each of the second subset of the plurality of accounts comprising the activation time for each account of the second subset of the plurality of accounts, the electronic transaction engagement score for each of the at least two micropersona subgroups, and the at least one predictive model;

determine, by the engagement scoring engine, whether the customer-level engagement score for the second subset of customers satisfies a threshold value;

determine, by a campaign system, a third subset of customers comprising a portion of the first subset of customers based on determining that the customer-level engagement score for each customer of the portion of the first subset of customers satisfies the threshold value;

automatically enroll, by the campaign system, the third subset of customers into a first automated campaign; and automatically enroll, by the campaign system, the first subset of customers into a second automated campaign different from the first automated campaign.

12. The computer program product of claim 11, wherein the program instructions further cause the at least one processor to:
  determine, by the segmentation engine, a fourth subset of customers from the second subset of customers, wherein, when determining the fourth subset of customers from the second subset of customers, the program instructions cause the at least one processor to:
    segment the second subset of customers into a plurality of subgroups, each subgroup of the plurality of subgroups comprising a different subset of the second subset of customers based on a probability of a customer conducting at least one electronic transaction, the plurality of subgroups comprising a subgroup corresponding to the third subset of customers; and
    automatically enroll, by the campaign system, the plurality of subgroups into the automated campaign or at least one different automated campaign based on a probability of customers in each subgroup conducting at least one electronic transaction.

13. The computer program product of claim 11, wherein the automated campaign comprises automatically communicating at least one message including an offer to a customer.

14. The computer program product of claim 11, wherein, when determining the third subset of customers comprising a portion of the second subset of customers, the program instructions cause the at least one processor to:
  determine the third subset of customers based on a clustering algorithm.

* * * * *